United States Patent [19]
Antoni

[11] Patent Number: 5,890,720
[45] Date of Patent: Apr. 6, 1999

[54] FORCE-ACTUATED CLAMPING CHUCK

[75] Inventor: Herbert Antoni, Neuss, Germany

[73] Assignee: Forkardt GmbH, Erkrath, Germany

[21] Appl. No.: 865,915

[22] Filed: May 30, 1997

[30] Foreign Application Priority Data

May 30, 1996 [EP] European Pat. Off. ............ 96 10 8677

[51] Int. Cl.⁶ .................................................. B23B 31/177
[52] U.S. Cl. ........................... 279/123; 279/110; 279/121
[58] Field of Search .................................... 279/123, 121, 279/110

[56] References Cited

U.S. PATENT DOCUMENTS

| | | | |
|---|---|---|---|
| 4,288,085 | 9/1981 | Antoni | 279/110 |
| 5,197,748 | 3/1993 | Wu | 279/4.12 |
| 5,292,139 | 3/1994 | Gaillard | 279/110 |

FOREIGN PATENT DOCUMENTS

| | | |
|---|---|---|
| 0546926 | 6/1993 | European Pat. Off. . |
| 800201 | 10/1950 | Germany . |
| 832834 | 2/1952 | Germany . |
| 1641977 | 7/1952 | Germany . |
| 2104904 | 8/1972 | Germany . |
| 2224318 | 11/1973 | Germany . |
| 3518332 | 5/1986 | Germany . |
| 3823933 | 3/1989 | Germany . |
| 2067933 | 8/1981 | United Kingdom . |

*Primary Examiner*—Steven C. Bishop
*Attorney, Agent, or Firm*—Robert W. Becker & Associates

[57] ABSTRACT

A force actuated clamping chuck has a chuck body with a central bore and at least two clamping jaws that are guided in radial jaw guides of the chuck body. The radial jaw guides have opposed sidewalls with a plurality of guide grooves which are engaged by a plurality of guide ribs provided at lateral surfaces of the clamping jaws. A clamping piston is axially guided in the central bore and has a throughbore for receiving a workpiece. The clamping piston has key grooves provided at the periphery thereof. The clamping jaws have a key member at an end thereof facing the clamping piston. The key members engage the key grooves. At least two of the guide ribs extending over the entire radial length of the clamping jaw have a trapezoidal cross-section. At least one of the guide ribs, extending over a portion of the radial length at an end of the clamping jaw remote from the clamping piston, has a trapezoidal cross-section.

1 Claim, 2 Drawing Sheets

FORCE-ACTUATED CLAMPING CHUCK

BACKGROUND OF THE INVENTION

The present invention relates to a force-actuated clamping chuck with a chuck body in which at least two radially extending clamping jaw guides for a respective clamping jaw are provided. The clamping jaw is preferably comprised of a base jaw and an attachment jaw whereby a plurality of guide grooves are provided in opposed sidewalls of the jaw guide and guide ribs matching the guide grooves are provided at the side surfaces of the clamping jaws.

Such clamping jaws are known from German Patent 800 201. The European Patent Application 0546926 also shows such clamping chucks with a plurality of guide grooves and guide ribs between the base jaw and the chuck body whereby in this known construction the forward portion of the chuck body, for the purpose of improved manufacturing, is divided into individual segments which are fastened by screws to the rear portion of the chuck body.

Also, so-called key member chucks are known in which the clamping jaws are guided with a key member in a corresponding key groove of an axially guided clamping piston guided within the chuck body and provided with a throughbore for receiving work pieces. In this known key member chuck, each clamping jaw is provided at its opposite sidewalls with guide ribs which engage corresponding guide grooves in the radial jaw guides of the chuck body. Because of the engagement of the key members, provided at the back of the clamping jaw, in the key grooves of the clamping piston and because of the embodiment of a throughbore within the clamping piston, the rearward guide surface of the jaw guides must be embodied shorter than the forward guide surface so that upon inner clamping of the work pieces, due to the shortened guide elements, higher tilting forces result which cause great surface pressure and thus an increased wear.

It is therefore an object of the present invention to provide a clamping chuck of the aforementioned kind with which the inherent system disadvantages can be avoided.

SUMMARY OF THE INVENTION

The force-actuated clamping chuck according to the present invention is primarily characterized by:

A chuck body having a central bore;
At least two clamping jaws;
The chuck body having a radial jaw guide for each one of the clamping jaws;
The radial jaw guide having opposed sidewalls with a plurality of guide grooves;
The clamping jaws having lateral surfaces with a plurality of guide ribs matching the guide grooves;
A clamping piston axially guided in the central bore;
The clamping piston having a throughbore for receiving a workpiece;
The clamping piston having key grooves provided at a periphery of the clamping piston;
The clamping jaws having a key member at an end thereof facing the clamping piston;
The key members engaging the key grooves;
Wherein at least two of the guide ribs, extending over the entire radial length of the clamping jaw, have a trapezoidal cross-section;
Wherein at least one of the guide ribs, extending over a portion of the radial length at an end of the clamping jaw remote from the clamping piston, has a trapezoidal cross-section.

According to the present invention, a key member chuck, having clamping jaws that are connected with key members in corresponding key grooves of a clamping piston that is guided in the chuck body and is provided with a throughbore for receiving workpieces, has at least two guide ribs, extending over the entire length of the clamping jaw, embodied within the forward portion of the clamping jaw with a trapezoidal cross-sectional profile and at least one guide rib, extending within the radially shortened rearward portion of the clamping jaw, embodied with a trapezoidal cross-sectional profile.

With this inventive suggestion, a key member chuck results with which at least two forward and rearward guide surfaces extending over the entire radial length of the clamping jaw are provided between the clamping jaws and the chuck body for transmitting forces and moments so that even for an inner clamping action high tilting moments and tilting forces can be taken up or compensated. In general, the inventive key member chuck exhibits great shape stability for the jaw guides whereby all guide elements have a uniform supporting action over their entire length.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of a specific embodiment utilizing FIGS. 1 and 2.

Figure 1:
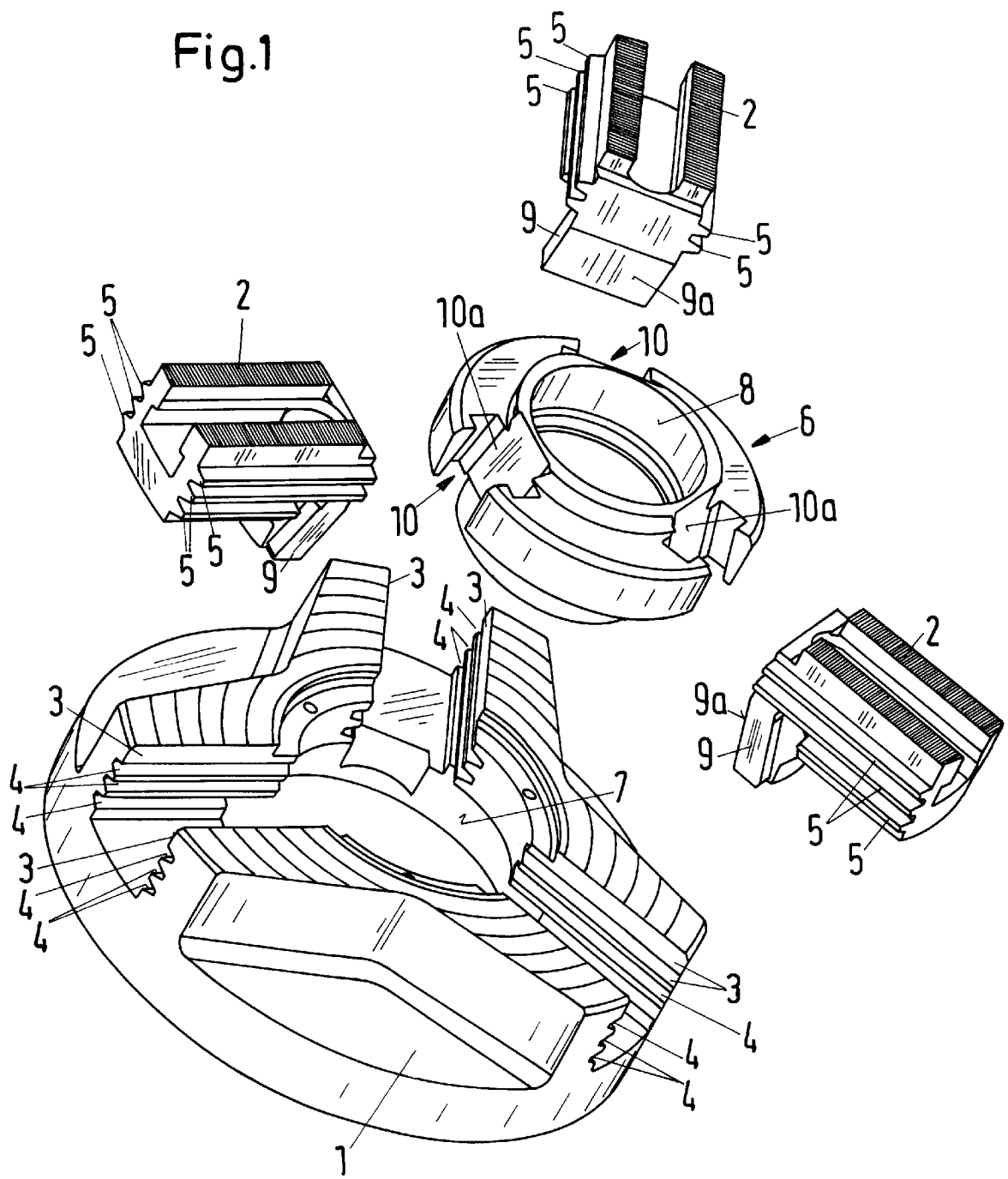
FIG. 1 shows a perspective exploded view of the inventive clamping chuck.
Figure 2:
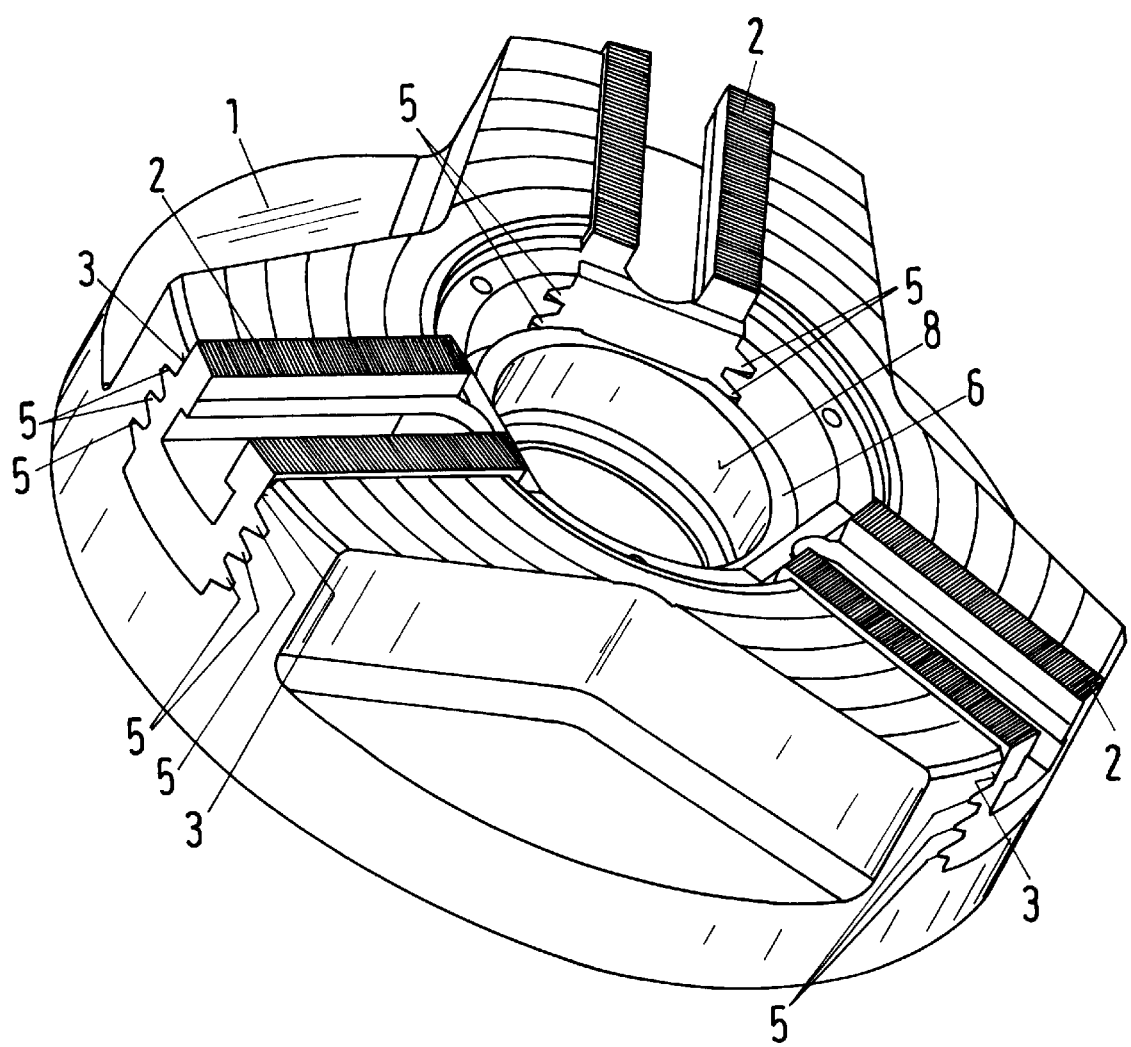
FIG. 2 shows a perspective end view of the clamping chuck according to FIG. 1 in the mounted state.

The clamping chuck represented in FIGS. 1 and 2 comprises a chuck body 1 in which three clamping jaws 2 are radially displaceably guided in jaw guides 3. For this purpose, the oppositely positioned sidewalls of the jaw guides 3 are provided with a plurality of guide grooves 4 and the lateral surfaces of the clamping jaws 2 have guide ribs 5 matching the shape of the guide grooves 4 and cooperating therewith. The radial displacement of the clamping jaws 2 is performed by a clamping piston 6 which is axially displaceable within a bore 7 of the chuck body 1 and which is covered by a protective bushing (not shown) in the direction toward the front and toward the throughbore 8. For receiving a workpiece to be machined, the clamping piston 6, positioned within the bore 7 of the chuck body 1, has a central throughbore 8.

Each clamping jaw 2, which in the shown embodiment is embodied as a base jaw, comprises a radially inwardly positioned rear portion in the cross-sectional shape of a T, forming a key member 9 for radial displacement of the clamping jaw 2 by the clamping piston 6 in correspondingly embodied key grooves 10 of the clamping piston 6. For guiding the key members 9 of the clamping jaw 2 within the key groove 10 of the piston 6, the radially inwardly positioned, rear portion of the key member 9 is provided with a continuous key surface 9a which cooperates with an also continuously extending key surface 10a of the key groove 10 of the piston 6.

As can be seen in FIG. 1 the guide ribs 5 on the lateral surfaces of the clamping jaws 2 at the forward portion of the clamping jaw 2 extend over the entire length of the clamping jaw 2, while at the rear portion of the clamping jaw 2 the guide ribs 5, because of the presence of the key member 9, are shortened. As an especially advantageous shape for the embodiment of the guide ribs 5 a trapezoidal cross-sectional profile is suggested, as shown especially in FIG. 2.

Due to the guide ribs 5 at the forward portion of the clamping jaw 2 extending over the entire length of the clamping jaw 2, it is achieved that upon inner clamping of the workpieces the resulting high tilting moments are compensated by the entire length of the clamping jaw 2 via the guide ribs 5 and the guide grooves 4 so that no impermissibly high surface pressure will result which would cause increased wear.

The present invention is, of course, in no way restricted to the specific disclosure of the specification and drawings, but also encompasses any modifications within the scope of the appended claims.

What I claim is:

1. A force-actuated clamping chuck comprising:

a chuck body having a central bore;

at least two clamping jaws;

said chuck body having a radial jaw guide for each one of said clamping jaws;

said radial jaw guide having opposed sidewalls with a plurality of guide grooves;

said clamping jaws having lateral surfaces with a plurality of guide ribs matching said guide grooves;

a clamping piston axially guided in said central bore;

said clamping piston having a throughbore for receiving a workpiece;

said clamping piston having key grooves provided at a periphery of said clamping piston;

said clamping jaws having a key member at an end thereof facing said clamping piston, said key member projecting perpendicularly to a radial length of said clamping jaw;

said key members engaging said key grooves;

wherein at least two of said guide ribs, extending over the entire radial length of said clamping jaw, have a trapezoidal cross-section;

wherein at least one of said guide ribs, extending only over a portion of said radial length at an end of said clamping jaw remote from said clamping piston, has a trapezoidal cross-section;

wherein said jaw guides exhibit shape stability and a uniform supporting action over an entire length of said jaw guides.

* * * * *